July 24, 1956      P. T. NIMS      2,755,622
APPARATUS FOR CONTROLLING COMBUSTION TURBINES
Filed Jan. 15, 1948      6 Sheets-Sheet 1

INVENTOR.
Paul T. Nims.
BY Harness and Harris
ATTORNEYS.

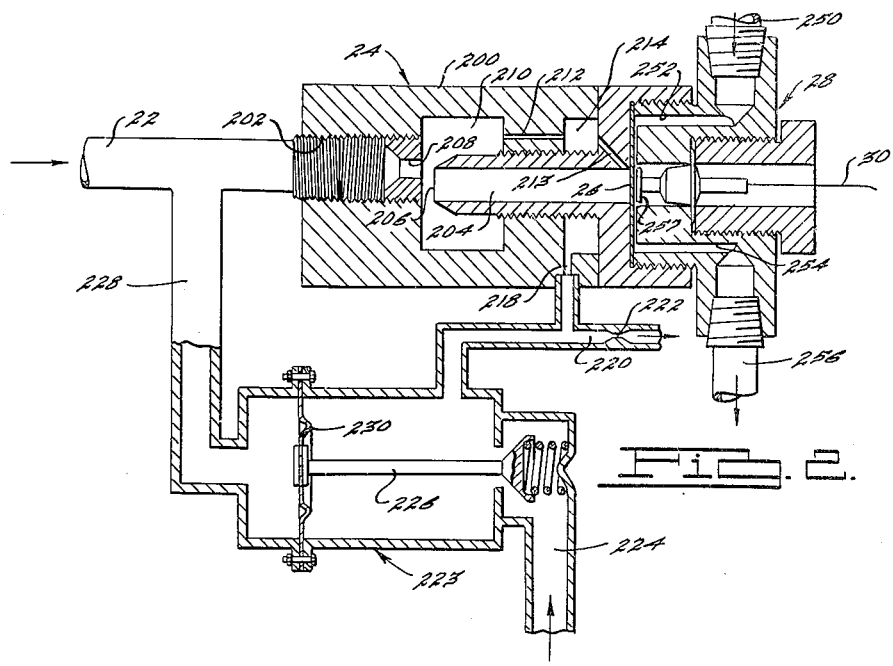
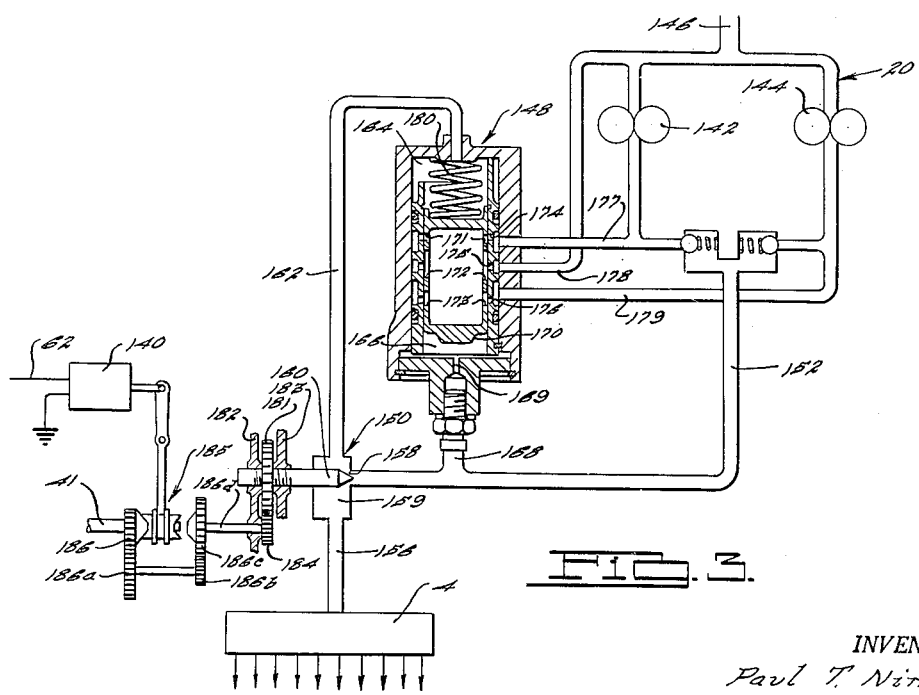

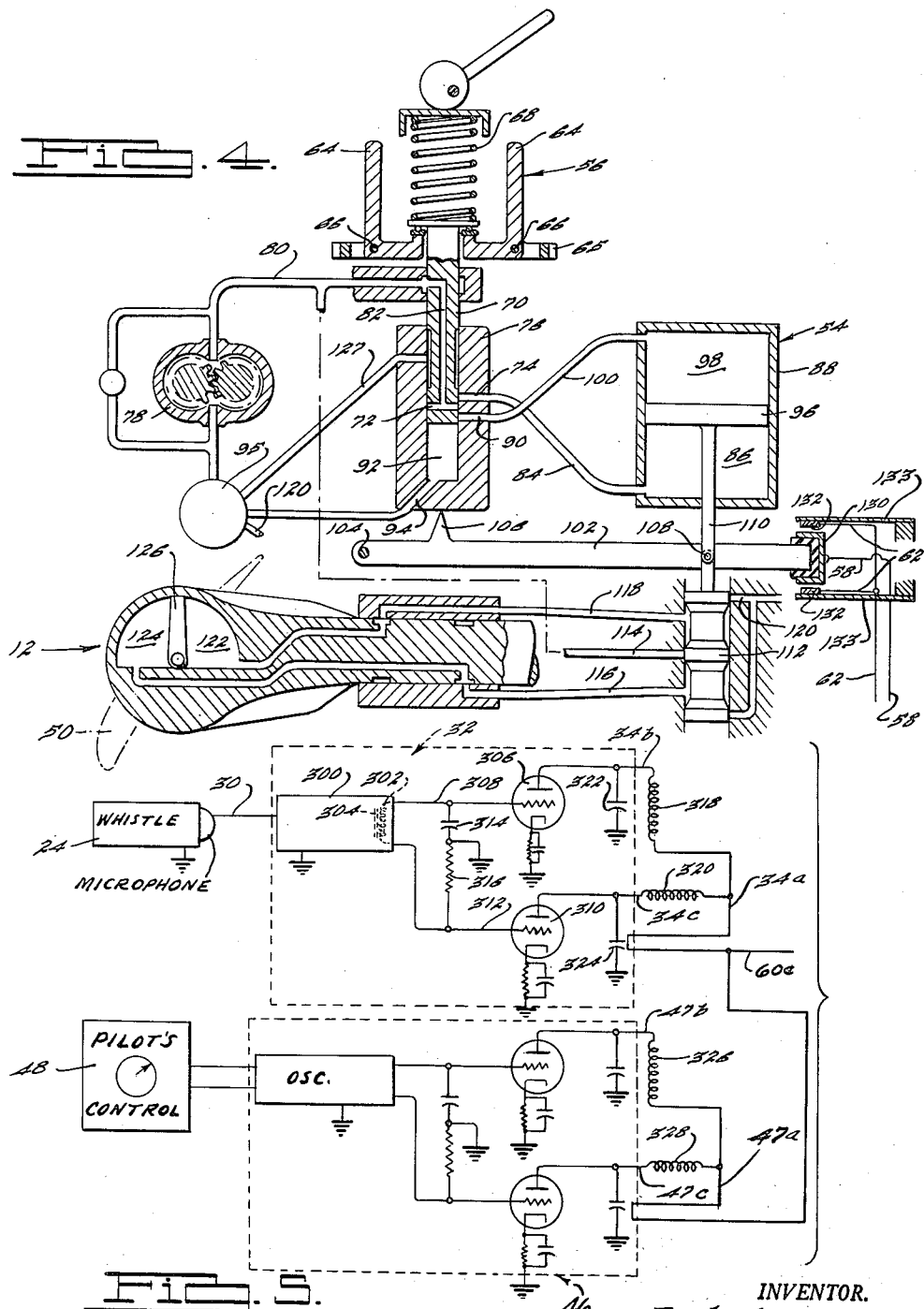

July 24, 1956 P. T. NIMS 2,755,622
APPARATUS FOR CONTROLLING COMBUSTION TURBINES
Filed Jan. 15, 1948 6 Sheets-Sheet 4
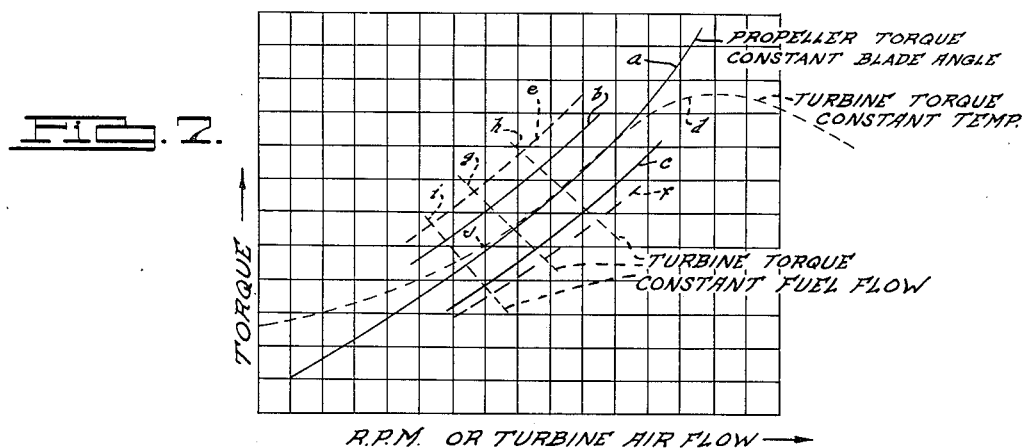
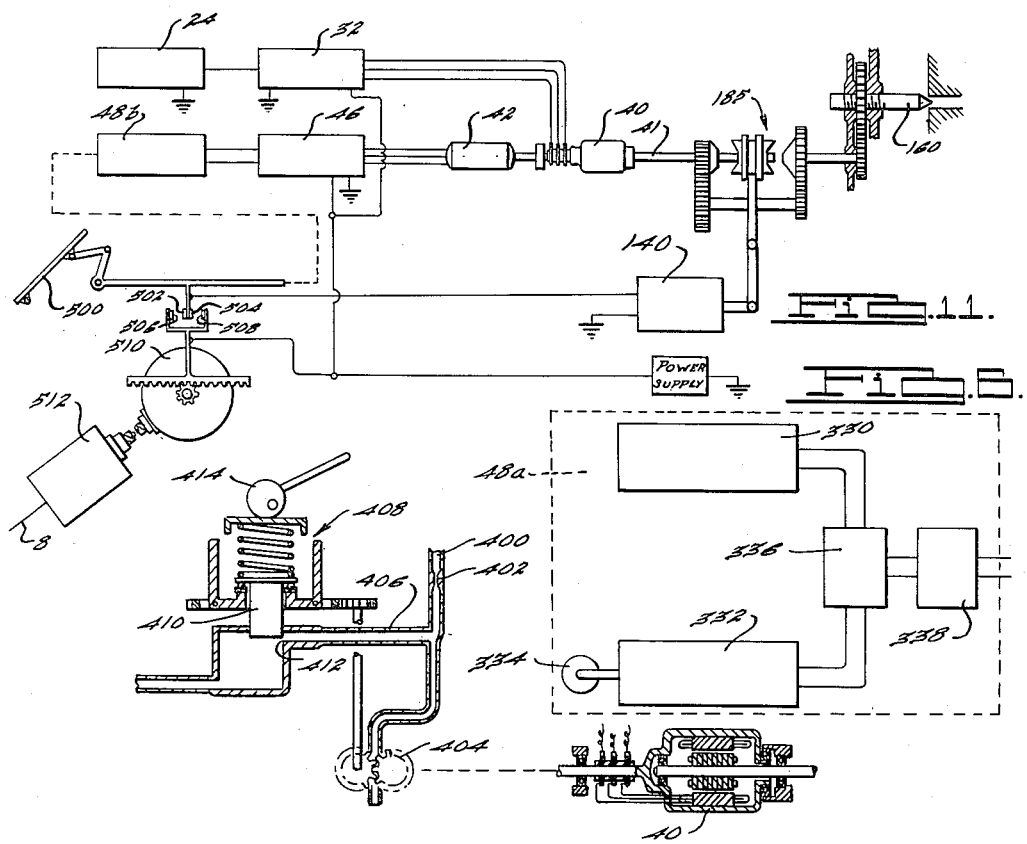
INVENTOR.
Paul T. Nims.
BY
Harness and Harris
ATTORNEYS.

July 24, 1956

P. T. NIMS 2,755,622

APPARATUS FOR CONTROLLING COMBUSTION TURBINES

Filed Jan. 15, 1948

INVENTOR.
Paul T. Nims.
BY
Harness and Harris
ATTORNEYS.

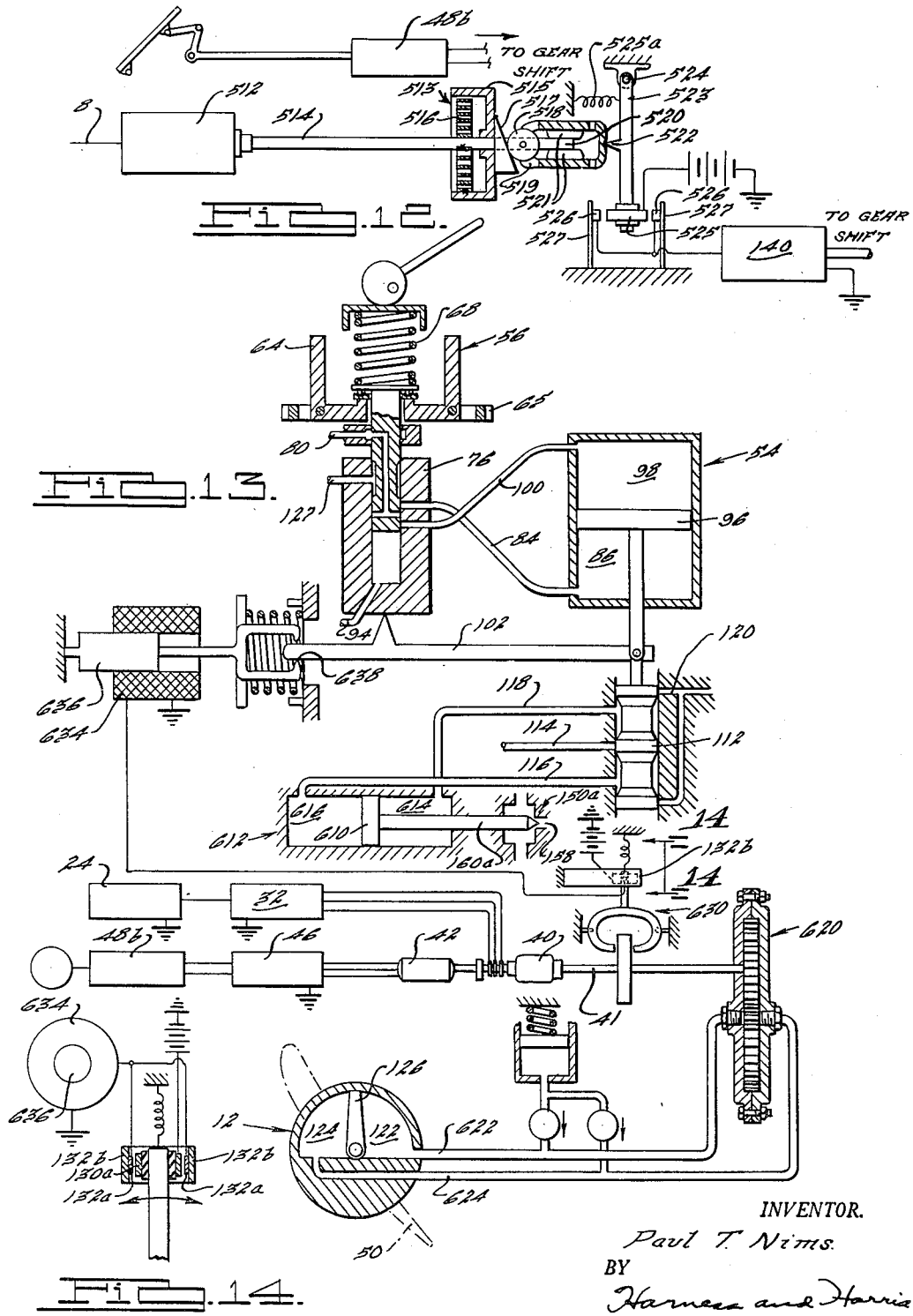

United States Patent Office 2,755,622
Patented July 24, 1956

2,755,622

APPARATUS FOR CONTROLLING COMBUSTION TURBINES

Paul T. Nims, Birmingham, Mich., assignor to Chrysler Corporation, Highland Park, Mich., a corporation of Delaware Application January 15, 1948, Serial No. 2,507

8 Claims. (Cl. 60—39.28)

This invention relates generally to control means for gas turbines and, more specifically, to means for controlling the fuel flow thereto.

One of the primary objects of the present invention is to provide an improved control system for a combustion turbine.

Another object is to provide such a system in which the flow of fuel is a function of the temperature of the combustive gases.

Another object is to provide such a system for use in a turbine-load combination in which the speed-torque characteristics of the turbine and load are substantially identical within the operating range.

Another object is to provide such a control means in which "hunting" of the turbine is prevented.

Another object is to provide a new means for measuring the temperature of the combustion gases of a gas turbine.

Another object is to utilize the frequency of an acoustical note as a measure of gas temperature.

A further object is to utilize the difference in frequency between the temperature-controlled acoustical note and a controlled frequency source as a measure of the error in gas temperature.

A further object is to utilize this differential frequency to control the change in fuel flow.

A further object is to utilize a high rate of change in fuel flow when the speed error is large and a low rate of change in fuel flow when the error is small to provide stable operation.

Other objects of the invention will become apparent from the following specification, the drawings relating thereto, and from the claims hereinafter set forth.

In the drawings in which like numerals are used to designate like parts in the several views throughout:

Fig. 2 is a detail view showing the whistle and the associated velocity control;

Fig. 3 is a detail view showing the fuel control system;

Fig. 4 is a schematic view of the propeller governor control;

Fig. 5 is a diagrammatic view of an electrical network used in the invention;

Fig. 6 is a schematic view showing a modified form of frequency control for the electrical network of Fig. 5;

Fig. 7 is a graphical view showing the speed-torque relationships of the turbine and propeller;

Fig. 8 is a diagrammatic view showing a modified means for driving the rotatable stator;

Fig. 11 is a view showing a modified form of the invention;

Fig. 12 is a schematic partial view of a modified form of the invention shown in Fig. 11;

Fig. 13 is a schematic view showing a further modification of the invention; and Fig. 14 is a view taken substantially along the line 14—14 of Fig. 13 and looking in the direction of the arrows.

Figure 1:
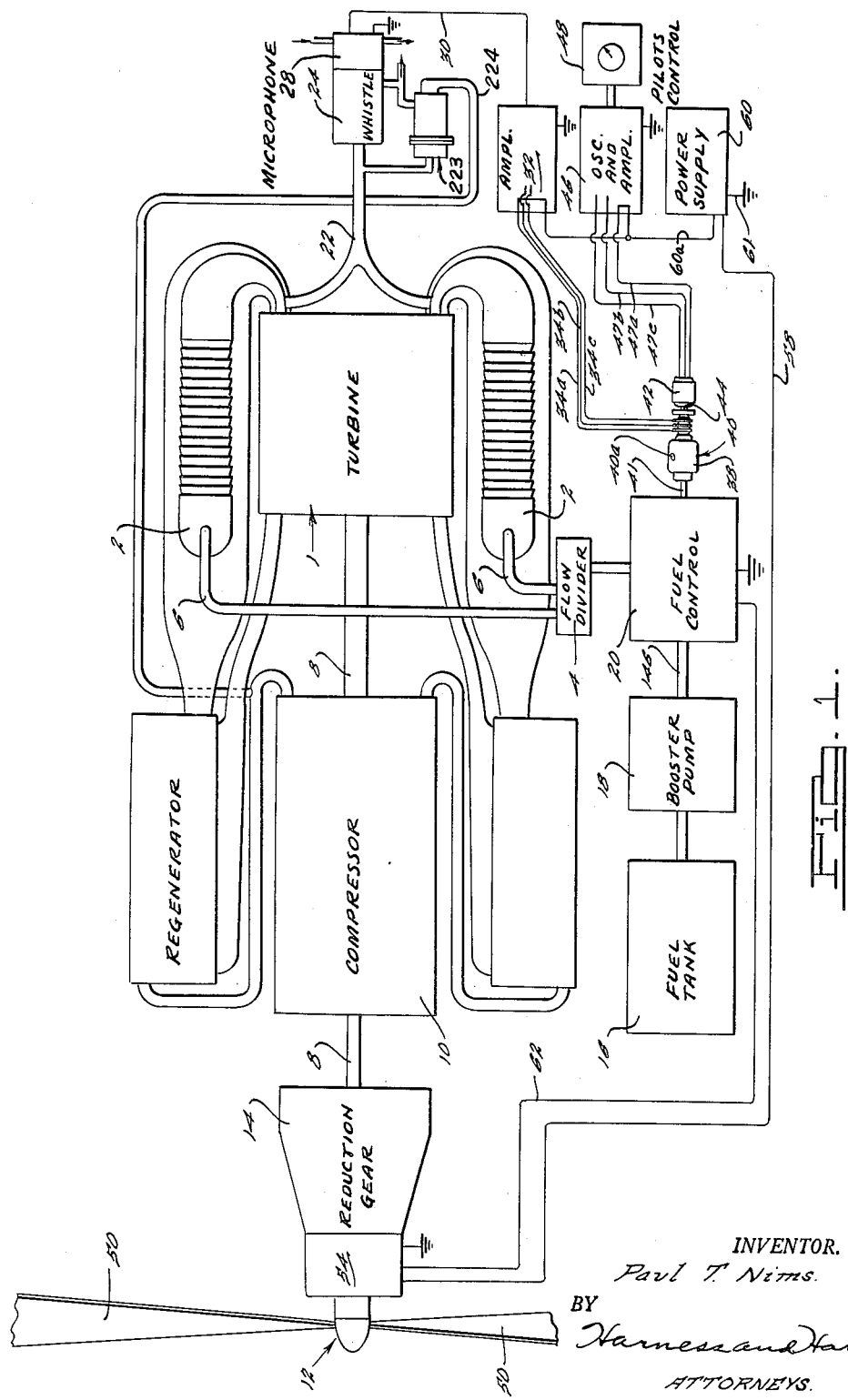
Figure 1 is a schematic view showing a gas turbine connected for driving an aircraft propeller and embodying the invention.

Although only a limited number of embodiments of this invention have been shown and described, it will be obvious to those skilled in the art that many modifications and changes may be made within the scope of the present invention and the drawings are, therefore, to be taken as illustrative rather than limitative of the invention, which is to be limited only by the scope of the hereinafter appended claims.

Due to the temperatures at which gas turbines must operate, care must be taken to control their temperature lest the turbine blades burn off. The problem of controlling the temperature of the combustion gases presents certain problems due to the temperature thereof since normal temperatures for combustion gases may be in the neighborhood of 1500° F. Because of this, many of the usual methods for measuring temperature are not satisfactory. Thermocouples have been tried but, when used unprotected in the gas stream, they are burned out quickly and rendered useless. Various methods of shielding the thermocouples have been tried out but when so shielded, the temperature of the thermocouple will not follow accurately the temperature of the combustion gases and hunting of the control system results.

My invention contemplates a new way of measuring gas temperature and comprises the utilization of the known principle that the velocity of sound in a gas is proportional to the square root of the absolute temperature thereof. In a whistle or organ pipe, the frequency of the note developed therein will depend upon the time required for a sound wave to traverse the pipe and return. Accordingly, if small amounts of the hot combustion gases are by-passed from the turbine and supplied directly to such a whistle or organ pipe so that the temperature of the gases in the resonating chamber are equal to that of the combustion gases, the frequency of the note generated by the whistle or pipe will be proportional to the temperature of the combustion gases if the length of the chamber remains constant. By the proper choice of material such as, for example, by using Stellite, the change in length of the whistle may be made to remain relatively fixed within the operating temperature ranges of the combustion gases so that the note developed by such a whistle will be proportional to the square root of the absolute temperature of the combustion gases.

If the acoustical note is now changed to an alternating electrical impulse and the frequency thereof compared with a controlled frequency indicative of the desired temperature, the difference in frequency will be a function of the temperature error of the gases and may be used for correcting the fuel flow, whereby the temperature of the combustion gases may be brought to the desired temperature. To this end, a closed end whistle or organ pipe is utilized in which the closed end comprises a diaphragm having a natural frequency well without the operating range of the frequency of the whistle or pipe. The diaphragm may form one plate of a condenser-type microphone; the output of this microphone is fed into an electrical amplifying network. The output voltage will have the frequency of the generated note and its frequency will be proportional to the temperature of the combustion gases.

Referring to the drawings by characters of reference, the numeral 1 designates generally a gas turbine having a plurality of fuel jets or burners 2 supplied with fuel from the fuel flow divider 4 through the conduit 6 and having an output shaft 8 for driving an air compressor 10 and the output load which, in the present instance, is a propeller 12. Reduction gearing 14 interconnects the shaft 8 with the propeller 12 whereby the propeller is driven at substantially lower speed than the speed of the gas turbine. Fuel for the turbine 1 is supplied from a fuel tank 16 through a booster pump 18 to a fuel control generally designated 20, the operation of which will be more completely described hereinafter.

To control the fuel flow, a sample of the hot gases from the jet 2 is collected by conduit 22 and utilized to blow a one-quarter wave length whistle 24. The tone of the note generated by the whistle 24 is a function of the temperature of the hot combustion gases. A diaphragm 26 closes the usual closed end of the one-quarter wave length resonating chamber 204 and forms one plate of a condenser-type microphone designated 28. An output conductor 30 of the microphone 28 controls the frequency output of an amplifier 32. The amplifier output is fed into a phase-splitting network, the two-phase output of which is conducted by means of conductors 34a, 34b and 34c to the two-phase stator 38 of an induction motor generally designated 40 and having a rotor-driven shaft 41. The motor 40 is arranged to adjust the fuel metered by the fuel control 20. A synchronous motor 42 has an output shaft 44 connected to bodily rotate the stator of the motor 40 in a direction opposite to the direction of rotation of its stator flux field in accordance with the frequency output of a control amplifier 46 also provided with a phase-splitting network and having a two-phase output connected as by means of conductors 47a, 47b and 47c for driving the motor 42. The frequency of the oscillator 46 is regulated by positioning the pilot oscillator control 48 which preferably is located in the cockpit of the plane with which the turbine and propeller are associated.

When the temperature of the combustion gases is correct, the frequency of the amplifier 46 should be such that the output frequency thereof will drive the stator 38 of the induction motor 40 at a speed equal to and opposite to the speed of rotating flux field of the stator 38 as driven by the amplifier 32 whereby this flux field will be stationary in space. Since the flux field under these conditions is nonrotative with respect to space, the associated rotor and shaft 41 will be stationary and no change will be imparted to the fuel control 20. Since the output frequency of the amplifier 32 is a function of the combustion temperature, the rate of rotation of the rotor shaft 41 of the motor 40 is a function of the difference in output frequencies of the amplifiers 32 and 46, and the output frequency of the amplifier 46 is a function of the adjustment of the control 48, this control 48 may be calibrated in terms of degrees temperature of the combustion gases.

The motor 40 generically may be of the induction-type, the synchronous-type or may be a combination of both types, any of which types are well known. If the straight induction-type is used, the rate of acceleration of its shaft 41 is a function of the frequency difference, sometimes called temperature error, between the two amplifiers. If the straight synchronous-type is used, the rate of rotation of the shaft 41 is a function of the temperature error. If a combined induction and synchronous-type is used, the movement of the shaft is a function of acceleration and speed. Such a combined type motor may be provided with an adjustment 40a whereby the relative effects may be proportioned. The direction of rotation of the flux field of the motor 40 and the direction of the bodily rotation of its stator 38 should be so chosen relative to the adjustability of the fuel control 20 that the shaft 41 is rotated in the same direction as the bodily rotated stator when the fuel control 20 is being adjusted to lower the temperature of the combustion gases. With such an arrangement, any friction drag of the rotor will tend to make the fuel adjustment more rapid in the decreased fuel direction especially when an induction motor type is used.

The propeller 12 is of the variable-pitch type and has propeller blades 50, the pitch of which are determined by means of a hydraulic pitch control generally designated 12 under control of a governor 54, whereby the propeller tends to control the speed of the turbine 1. Electrical energy for actuating the electrical circuits associated with the control 54 is supplied thereto through a conductor 58 from a power supply 60 having one output terminal grounded as at 61. The governor 54 not only controls the pitch of the blades 50 but also controls the energization of a conductor 62 for controlling the rate at which the fuel control 20 is controlled by the induction motor 40, as is more completely shown in Fig. 3 and which will be described in greater detail below.

Referring now more specifically to Fig. 4, the governor 54 is of a usual type and comprises a plurality 56 of individual centrifugal weights 64 rotated by gear 65 through a suitable gear train, not shown, in proportion to the speed of rotation of the propeller 12 in any usual manner. As the speed of rotation of the weights 64 increases, they tend to pivot about their pivot points 66, whereby the upper portion thereof is moved in an outward direction against the force of the governor spring 68. As the weights 64 rotate about their points 66, the shorter leg portions thereof act to raise the valve stem 70 in an upward direction, whereby the valve port 72 thereof is brought into at least partial registry with the port 74 of the sleeve member 76. Fluid under pressure now flows from the fluid pump 78 through conduit 80, to passageway 82 of the stem 70 through the ports 72 and 74 and conduit 84 to the lower pressure chamber 86 of a movement multiplier or hydraulic relay 88. At the same time, port 90 of the sleeve 76 opens into the lower chamber 92 thereof which is in constant open communication through port 94 with the source of fluid supply 95 for the pump 78. Fluid under pressure flowing into the pressure chamber 86 causes the piston 96 to be moved upwardly, the fluid from the pressure chamber 98 exhausting through conduit 100 and port 90 to the chamber 92 from whence it flows through the port 94 back to the reservoir 95.

A lever member 102 pivoted on a suitable pivot 104 and in operative engagement with the valve member 76, as by means of the abutment 106, is connected as at 108 to the piston stem 110 associated with the piston 96. As the piston 96 moves upwardly, the lever 102 is rotated about its pivot 104 in a counterclockwise direction moving the sleeve member 76 upwardly with respect to the valve stem 70, so that the port 74 is moved out of registry with the port 72, whereby further upward movement of the piston 96 is discontinued. This same upward movement of the piston member 96 which rotated the lever 102 also moves the valve member 112 upwardly whereby conduit 114 is brought into communication with conduit 116 and conduit 118 is brought into communication with the exhaust conduit 120 whereby fluid under pressure flows from the conduit 114, through the conduit 116 into the pressure chamber 124 of the pitch-controlling mechanism for movement of the vane 126 to increase the pitch of the blades 50. The pressure chamber 122 will exhaust through the conduits 118 and 120.

As the speed of rotation of the propeller 12 decreases, the weights 64 will rotate inwardly about their pivots 66 moving the valve stem 70 downwardly whereby the ports 72 and 90 will be brought into communication for flow of fluid to the pressure chamber 98 and whereby the port 74 will be opened for communication with the conduit 127 for exhausting liquid from the pressure chamber 86. The piston member 96 will move downwardly substantially in the reverse manner to that described above causing the valve 112 to return to the position shown in which the conduits 116 and 118 are closed to fluid flow whereby the vane 126 will be held in its new position holding the blades 50 at the new blade angle. The sleeve member 76 will, as above described, close the ports 74 and 90 to fluid flow and the control 54 will continue to hold the blades 50 at their new angle.

The lever 102 also carries a pair of oppositely positioned contact members 130 which are cooperable respectively with a pair of upper and lower contact members 132 connected to the conductor 62 and carried by flexible arms 133 which will permit continued movement of the lever 102 after engagement of the contact members 130—132. When the movement of the piston member 96 is of relatively small magnitude indicative of only a slight speed error of the propeller 12, the movement of the weights 64 about their pivots 66 will be small and, therefore, movement of the piston member 96 and of the lever 102 will be small and neither of the contacts 132 will be engaged by either of the contacts 130, and the conductor 62 will not be energized. If, however, a relatively great change in speed of the propeller 12 occurs, movement of the piston member 96 will be substantial and the movement multiplier will move the lever 102 sufficiently to close one of the sets of contacts 130—132 and, depending upon the magnitude of the error, in some instances to flex the associated arm 133. Assuming that such change of speed is an increase, the lever 102 will be rotated counterclockwise causing the upper contact member 130 to engage the upper one of the contacts 132, energizing the conductor 62 from the conductor 58 which is connected to the power supply 60. Energization of the conductor 62 energizes a solenoid 140 of the fuel control 20, whereby the rate at which the shaft 41 acts to adjust the fuel control 20 for any given temperature error is increased for a purpose to be described in greater detail below.

The fuel control 20 (Fig. 3) comprises a main fuel pump 142 and an emergency fuel pump 144 supplied with fuel from a supply conduit 146 which is in communication with the booster pump 18. Normally, the fuel pumps 142 and 144 each have a pumping capacity greater than the normal fuel consumption of the turbine 1, the excess being by-passed around the pumps under control of the pressure regulating valve 148 which acts to provide a constant differential in pressure across the fuel controlling valve 150.

Fuel from one or both of the pumps 142 and 144 flows through the fuel supply conduit 152 to the fuel flow regulating valve 150 and the conduit 156 to the flow divider 4. The valve 150 comprises an inlet port 158 communicating with the conduit 152, a chamber 159 and a valve needle 160. The chamber 159 is in open communication with the conduit 156 and with a conduit 162 which is, in turn, in open communication at its other end with the upper pressure chamber 164 of the valve 148. The lower pressure chamber 166 of the valve 148 is connected by means of a conduit 168 and orifice 169 with the conduit 152. A hollow movable valve member 170 is slidably positioned within the valve 148 and has an upper and a lower wall which form, respectively, the lower and the upper end walls of the pressure chambers 164 and 166. The member 170 has a series of rows 171, 172, 173 of spaced ports which, as will be apparent below, align themselves with rows 174, 175 and 176 of ports in the stationary portion of the valve 148. The ports of the row 174 are in direct communication with the outlet of the pump 142 through the conduit 177, those of the row 175 with the inlet conduit 146 through branch conduit 178, and those of the row 176 with the outlet of the pump 144 through the conduit 179. A spring 180 is located in the chamber 164 and is held under compression between the member 170 and the end wall of the chamber 164. The spring 180 exerts sufficient force so that when the desired high pressure of conduit 152 is reacting against the lower wall of the member 170 and the desired lower pressure of the conduit 156 is reacting against the upper wall of the member 170, the member 170 will remain in the position it then happens to be in.

As the pressure drop across the port 158 decreases, the downward forces acting on the member 170 will increase relative to the upward forces acting thereon and the member 170 will move downwardly. Downward movement of the member 170 from the position shown restricts the fluid flow through the ports of the cooperating rows 171 and 174, thereby causing the pump 142 to deliver a greater proportion of its output to the conduit 152. Conversely, at any position of the member 170 below that shown, as the pressure across the port 158 increases above that desired, the ports of the rows 171 and 174 will permit more of the output of the pump 142 to by-pass.

If the pressure in the conduit 152 should continue to be too low even after the ports of the row 174 have been completely closed, the member 170 will continue its downward movement under the force exerted by the spring 180 and flow through the ports of the row 176 will be restricted, increasing the output pressure of the pump 144 and causing some of its output to be supplied to the conduit 152. The ports of the rows 172 and 175 are in constant open communication at all operating positions of the member 170 so that fuel which enters the member from the pumps 142 and/or 144 may flow to the supply conduit 146. It may now be seen that valve 148 will act to maintain a constant differential in pressure across the port 158 irrespective of the restriction to fuel flow through the divider 4 and burners 2 and which is so associated with the two fuel pumps, that one fuel pump will normally supply fuel for operation of the gas turbine 1, but upon failure thereof to supply the desired quantity of fuel, the valve 158 will automatically position itself to cause fuel to be supplied from the other of the fuel pumps. Since the valve 148 will always maintain a substantially constant pressure differential across the port 158, any relative positioning of the needle 160 of the valve 150 will provide a predetermined fuel flow through the conduits 152 and 156 for delivery to the gas turbine 1.

The stem portion of the needle 160 is screw threaded for reception by a gear 181 held against lateral movement by guide members 182 and 183 and rotated by a pinion gear 184. Such rotation of the gear 181 will cause the needle 160 to move toward and away from the port 158 for changing the fuel delivered to the turbine 1. The pinion 184 is driven by the shaft 41 through two-speed gearing 185 whereby the rate of change in fuel flow for any speed of operation of the shaft 41 may be made at either of two rates. The solenoid 140 controls the shifting of the gearing 185. When de-energized, the solenoid holds the gearing 185, as shown, to provide a slow rate of fuel change by driving the pinion 184 through gears 186, 186a, 186b and 186c to shaft 186d and, when energized, shifts the gearing 185 to provide a faster rate of fuel change by driving the shaft 186d directly. As will be obvious, the gear 186 is loose on the shaft 41 and the slidable clutch member actuated by the solenoid will clutch with either the gear 186 or the shaft 186d.

Referring more specifically to Fig. 2, the sample of the combustive gases being supplied to the gas turbine 1 is taken out through the conduit 22 and flows through the whistle 24. The whistle 24 comprises generally a casing 200 having an inlet opening 202 to which the conduit 22 is attached, and having a resonating chamber 204, which is closed at its far end by the diaphragm 26 whereby it is subjected to maximum pressure changes of the vibrating gases in the whistle 24, and which is open at its other end 206 to the inlet orifice 208. A portion of the sample gas flowing through the conduit 22 passes from the orifice 208 into the resonating chamber 204 and another portion of the gas passes through the orifice 208 into the annular chamber 210 and thence through passageways 212 to the rear annular chamber 214. A passageway 213 connects the rear end of the resonating chamber 204 adjacent the diaphragm 26 with the annular chamber 214. An outlet passageway 218 connects the chamber 214 with an outlet conduit 220 in open communication with atmosphere through an orifice 222.

The passageways 212 and 213 may be, and preferably are, of restricted cross section so that with normal pressures in the turbine sufficient restriction is afforded to the flow of the sample gas so that the velocity thereof through the whistle is within predetermined desired limits. It has been found that the velocity of air through such a whistle as is described must be kept within predetermined limits or the whistle will no longer generate the fundamental note, but will suddenly jump to a harmonic of this note. An additional velocity regulator 223 may be provided as shown. Such a means may comprise a supplementary source of air under pressure supplied through a conduit 224 to the conduit 220 under control of a valve 226. The valve 226 is controlled by the pressure of the gases in the conduit transmitted through a branch conduit 228 to one side of a pressure-sensitive diaphragm 230 of the regulator 223. As the pressure within the conduit 22 increases, the diaphragm 230 will be flexed to the right, as viewed in Fig. 2, thereby opening the valve 226 for increased flow of air from the conduit 224 to the conduit 220. This increased flow of air must pass outwardly through the orifice 222 and, since with a particular pressure drop across an orifice only a predetermined flow of fluid will pass therethrough, the back pressure through the whistle 24 will be correspondingly increased to decrease the velocity flow of the combustion gases from the conduit 22 through the whistle 24. Since the frequency of the note developed by the whistle will be proportional to the square root of the absolute temperature of the gases in the resonating chamber 204, there must be maintained through the whistle a substantial flow of gases so that the gases within the resonating chamber 204 will not have an opportunity to cool down but will be substantially equal in temperature to the temperature of the combustion gases actually passing to the gas turbine 1. The temperature of these gases will be in the neighborhood of 1500° F. so that the diaphragm 26 must be cooled. This cooling is provided by passing air through a conduit 250 into passageway 252 and thence downwardly across the rear face of the diaphragm 26 and outwardly through passageway 254 and through conduit 256. The temperature of the gases in the conduit 228 and those in contact with the diaphragm 230 need not be maintained at any particular temperature. Since there is no through passageway for fluid flow through the conduit 228, the gases against the diaphragm 230 will be substantially cooler than 1500° F. and no special cooling provision other than that afforded by the air passing through the valve 226 is necessary to maintain the diaphragm within proper operating temperatures.

The diaphragm 26 will vibrate in accordance with the vibrating air column set up in the resonating chamber 204 of the whistle 24, which vibrating diaphragm will cooperate with a fixed terminal 257 insulated from the whistle casing to provide a variable condenser. The terminal 257 is connected by the conductor 30 to the input of the amplifier 32. The frequency of vibration of the diaphragm 26 and, consequently, the amplifier 32, will be proportional to the temperature of the combustion gases in the gas turbine 1.

Referring to Fig. 5, the amplifier 32 is shown as comprising any usual form of voltage amplifier 300 to which the conductor 30 from the whistle 24 is attached in any well known manner to control its frequency. The output of the voltage amplifier 300 is supplied from a secondary winding 302 of its output transformer 304. One terminal of the winding 302 is directly connected to the grid of one power tube or valve 306 by means of the conductor 308. The other terminal of the winding 302 is connected to the grid of the power tube or valve 310 by means of the conductor 312. The conductors 308 and 312 are connected together by series arranged capacitor and resistor 314 and 316, respectively. The common sides of the resistor and capacitor, respectively are connected to ground. The cathodes of the valves 306 and 310 are connected to ground through suitable resistors preferably of the illustrated conventional self-biasing type. With this arrangement, the grids of the valves 306 and 310 will be rendered positive at intervals 90° from each other whereby the windings 318 and 320 of the stator of the motor 40 will be energized with a voltage which is displaced 90° with respect to each other. The valves 306 and 310 will act to conduct current only during one-half cycle of the amplifier voltage, therefore, condensers 322 and 324 are provided in parallel arrangement with the valves 306 and 310, respectively, which will discharge through the windings 318 and 320, respectively, during the opposite half cycle to the half cycles in which the valves 306 and 310 are conductive.

The amplifier 46 is similarly arranged to the amplifier 32 for energizing the windings 326 and 328, respectively, of the stator of the synchronous motor 42. The frequency of the amplifier 32 is controlled by the note generated in the whistle 24 while the frequency of the amplifier 46 is controlled by means of the pilot control 48 which may be any convenient and usual means for controlling the frequency output of an amplifier. The various windings for the amplifiers 46 and 32 are energized by the power supply 60, a suitable conductor 60a being provided for this purpose.

In Fig. 6, 48a designates generally a modified form of pilot control for controlling the generated output frequency of the amplifier 46. The control 48a comprises a fixed frequency oscillator 330, a variable frequency oscillator 332 adjustable by means of the control knob 334, a mixing network 336 and a low pass filter 338; the elements 330, 332, 334, 336 and 338 being of any of the usual type so that a fixed frequency oscillating note may be generated by the oscillator 30 and fed into the mixing network 336. A variable frequency note is also fed into the mixer 336 from the oscillator 332, the exact frequency of which may be controlled by means of the adjustable control 334. The difference in frequency between that of the oscillator 330 and 332 is fed by the mixer 336 into the low pass filter 338 for transmission to the amplifier 46.

The fixed frequency oscillator 330 is arranged to oscillate at a frequency which corresponds to the frequency of the note generated by the whistle at that temperature corresponding to the highest gas temperature desired for the operation of the gas turbine 1. The variable frequency oscillator 332 is arranged to oscillate at a frequency from zero up to the frequency which is equal to or slightly greater than the difference in frequency of the note generated by the whistle at the highest desired operating combustion gas temperature and that generated by the whistle at the lowest desired gas operating temperature. The control 334 for normal operation is adjusted so that the difference in frequency between that of the oscillator 330 and that of the oscillator 332 is exactly the frequency of the note generated by the whistle 24 when the temperature of the combustion gases of the turbine 1 is at the desired operating temperature. To adjust the operating temperature, the frequency of the oscillator 332 is increased to decrease the frequency supplied by the mixer network 336 through the low pass filter to the amplifier 46, thereby calling for the fuel control 20 to adjust the fuel for a lower operating temperature of the turbine 1. As the frequency of the variable frequency oscillator 332 is decreased, the frequency supplied by the mixer 336 through the low pass filter 338 to the amplifier 46 will be increased, whereby the fuel control 20 will act to maintain the temperature of the combustion gases of the turbine 1 at a higher temperature.

By use of the control 48a, the fixed frequency oscillator 330 may be preset so that the frequency supplied by the mixer 336 through the low pass filter to the amplifier 46 may never exceed the frequency of the note generated by the whistle 24 when being supplied with the hottest temperature combustion gases for the turbine 1 at which the turbine is permitted to operate. With this arrangement, the pilot is unable to operate the turbine beyond a predetermined limit and in the event of failure of the oscillator 332, no serious damage will occur to the turbine 1.

For certain types of loads driven by the gas turbine 1, the foregoing described control of the fuel valve 160 would be sufficient to cause the gas turbine 1 to operate at a particular output. In the driving of a propeller, however, it will be noted from a reference to Fig. 7, that the propeller torque curve with constant blade angle within the operating range thereof is substantially identical with the torque curve of the turbine at constant temperature. From an analysis of the curve, if the turbine were maintained at a constant temperature and the propeller blade maintained at a constant blade angle, there would be a substantial range of unstable operation. If the turbine temperature is allowed to vary and the fuel flow remain constant, the resulting torque output, as shown by the curve thereof in Fig. 7, will extend at a substantial angle relative to the torque characteristics of the propeller 12 indicating a stable operating relationship therebetween.

As indicated in Fig. 7, the reference character $a$ indicates generally the torque-speed relationship of the propeller 12 when operating at a constant blade angle. The reference character $b$ represents the speed-torque characteristic of the same propeller when the blade angle is increased. The reference character $c$ indicates the torque-speed characteristic of the same propeller when the blade angle is less than that represented by the curve $a$. The curve $d$ shows the torque-speed characteristics of the turbine 1 when operating at a selected constant temperature. The curve $e$ indicates a portion of the torque-speed characteristics of the turbine when operating at a higher temperature, while the curve $f$ shows a portion of the speed-torque characteristics of the turbine 1 when it is operating at a lower temperature than that represented by curve $d$.

Under normal flight conditions of the airplane, it is desired to operate the propeller 12 at a substantially constant speed. It will be appreciated from a study of Fig. 7 that were the turbine controlled solely by the note of the whistle 24, the fuel rate delivered to the turbine would be adjusted so that the turbine would operate anywhere along the curve $d$. The exact position along the curve $d$ should be determined by the torque-speed characteristic of the load driven thereby which, in this case, is the propeller 12 which has a characteristic represented by the curve $a$. It will be noted that the curves $a$ and $d$ for a substantial distance are substantially superposed one upon the other so that the speed of the turbine and of the propeller 12, within the range with which the curves $a$ and $d$ are substantially superposed one upon the other, is indeterminate. By varying the blade pitch, the speed-torque characteristics of the propeller may be altered as, for example, between the lines $b$ and $c$. Such change of blade angle may be effected as described in connection with Fig. 4 by means of the control 54. Since the change in blade angle between that represented by the curve $b$ and that represented by the curve $c$ is substantial, and since the control 54 acts as the speed of the propeller 12 approaches the desired operating speed to return the blade angle to the speed-torque characteristic represented by the line $a$, very little speed stability would be had with the propeller controlled by its control 54 and the turbine controlled by the whistle 24 which acts to maintain the turbine combustion gases at an exact constant temperature. It is therefore proposed to change the ratio of drive of the valve 160 by the motor 40 so that when the speed error is substantial, the whistle 24 will act to change the fuel flow as supplied by the needle 160 at a rapid rate to maintain the temperature of the combustion gases of the turbine 1 substantially constant. When, however, the speed error becomes small, the ratio of drive from the motor 40 to the needle 160 will be substantially reduced so that the rate of movement of the needle 160 and, consequently, the rate of change of fuel flow to the turbine 1 will be very small and will be a near approximation for substantially constant fuel flow operation of the turbine 1.

It is to be understood, however, that the regulation of the fuel to maintain exactly constant temperature of the turbine and also, at another time, the regulation of the propeller blade pitch with the fuel flow maintained substantially constant will be difficult so that it is merely desired to find a close approximation which is done by changing the position of the needle 160 relative to the port 158 at fast and slow rates, as determined by energization of the solenoid 140 under control of the switch contacts 130 and 132 in the control 54. In this manner, it might generally be said that upon a great speed error, the torque-speed characteristics of the propeller 12 will move from the line $a$ to the line $b$ due to the action of the governor 56 of the control 54, which action of the governor 56 also closes the contacts 130 and 132, thereby energizing the solenoid 140 whereby the motor 40 operating through its shaft 41 is effective to make rapid changes in positioning of the needle 160 and, consequently, of the fuel flow to the turbine 1, whereby the turbine will operate substantially along the curve $d$, as shown in Fig. 7. Since at this time it can be assumed that the propeller 12 will be operating along the characteristics as shown by the line $b$, it is evident that the speed of the turbine and of the propeller will be rapidly decreased, since the torque required to maintain this speed of operation of the propeller, as shown by the line $b$, is substantially greater than the output torque of the turbine, as shown by the line $d$. When, however, the speed of the propeller and turbine have been reduced sufficiently so that it is just in excess of the desired speed, the governor 56 will act to open the contacts 130 and 132 thereby de-energizing the solenoid 140 and changing the gear ratio of the drive 185 so that the needle 160 is driven at a very low rate of change with respect to operation of the motor 40, so that it can be said that the turbine is, under control of the fuel control 20, acting at substantially constant fuel flow along the line $g$. It will be noted that under these conditions, it will substantially follow the line $g$ near its intersection with the curve $d$, at which point the operation of the turbine-propeller assembly will be stable. With small speed errors of the propeller 12, the governor 56 will not act to close the contacts 130 and 132 and the turbine 1 may be said to operate substantially along the line $g$ which extends very nearly perpendicular to the line $a$ representative of the speed-torque characteristic of the propeller 12 which is being driven by the turbine 1.

It will be apparent, however, that the description just given is illustrative only since the control 54 under operation of the governor 56 will be continually changing the blade angle so that the propeller will not actually operate along the line $b$ except at one particular point but will be operating upon a number of speed-torque characteristic curves which are infinite in number, which lie between the curves $a$ and $b$. Similarly, since the needle 160 is actually being adjusted relative to its port 158 so that the fuel flow to the turbine 1 is actually being changed to some extent, the turbine will never quite operate along the line $g$ but will be operating along a series of lines similar to $g$. It may thus be seen that by the use of the two-speed interconnection of the needle 160 with the motor 40, substantial stability may be obtained for driving a variable pitch propeller having a constant pitch torque-speed characteristic very similar to the speed-torque characteristic of the turbine which would otherwise produce unstable operation.

In Fig. 8, there is shown a modified form of constant speed drive for rotating the stator of the motor 40. In this embodiment, fluid under pressure is supplied from a suitable source into the conduit 400 from whence it flows through an orifice 402 to a fluid motor 404 connected to rotate the stator of the motor 40. A by-pass conduit 406 is connected to the conduit 400 intermediate the orifice 402 and the fluid motor 404 and opens into a suitable drain, not shown. Fluid flow through the conduit 406 is controlled by means of a governor 408 which may be of the usual flyball-type and has a longitudinally movable sleeve 410 which acts to regulate the flow of by-pass fluid through port 412. The governor 408 is driven by the motor 404 and acts to open and close the port 412 in accordance with slight changes in speed of the fluid motor 404 whereby the motor 404 is driven at a substantially constant speed. The setting of the governor 408 is controlled by the spring adjustment cam 414 whereby the speed of bodily rotation of the stator 38 may be controlled and consequently, the desired operating temperature of the turbine 1. The pressure fluid for the conduit 400 may be supplied from the engine lubricating system, from the pressure fuel system or any other pressure system associated with the engine or such a system provided for the specific purpose.

Figure 9:
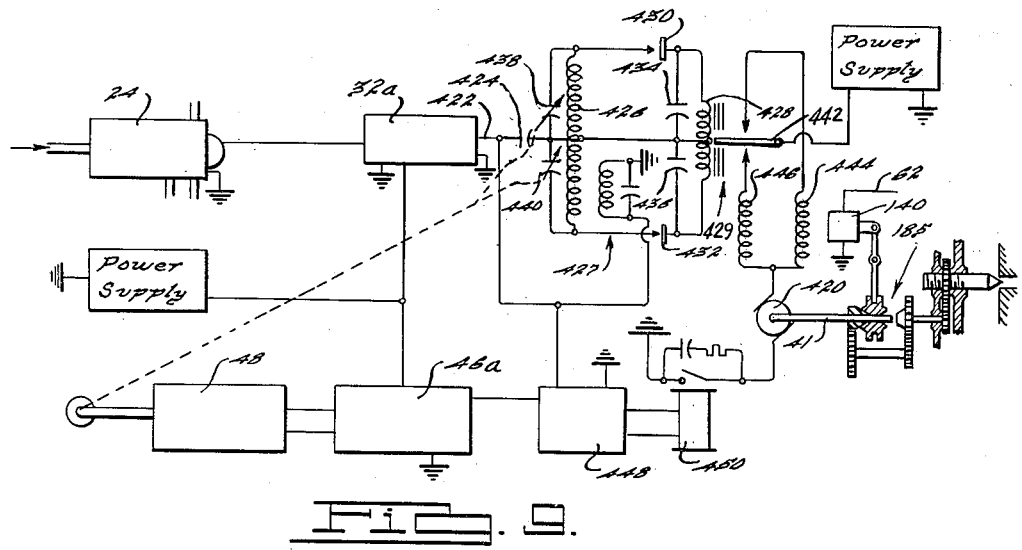
Fig. 9 is a diagrammatic view of a modified electrical network for use in the invention.

In Fig. 9, there is shown a modified form of electrical system for interconnecting a voltage amplifier 46a operating under control of the pilot's control 48 with a voltage amplifier 32a for control of the shaft 41 of a direct current motor 420. The amplifier 32a is controlled by the whistle 24 in the manner described above, while the oscillator amplifier 46a is controlled by means of the pilot control 48 also described above. One of the output terminals of the amplifier 32a is connected by means of conductor 422 through a condenser 424 to the center tap connection of the primary winding 426 of a transformer 427, to the center tap connection of the actuating coil or winding 428 of a polarized relay 429 and to one terminal of the primary winding of the transformer 427. The other output terminal of the amplifier 32a is connected directly to ground as is the other terminal of the primary winding of the transformer 427. A pair of tuned circuits, one embodying the upper half of the winding 426 and the condenser 438, and the other tuned circuit including the other or lower half of the winding 426 and the condenser 440 are provided. The two just-mentioned tuned circuits are connected respectively to the upper and lower halves of the winding 428 by connecting one end of the winding 426 with one end of the winding 428 through a rectifier 430 and by connecting the other terminal of the winding 426 and the other terminal of the winding 428 through a rectifier 432. The rectifiers 430 and 432 may be and preferably are of the dry disc-type. Condensers 434 and 436 are connected directly in parallel with opposite halves of the winding 428 to provide for energization of the winding 428 during the half cycles when the rectifiers 430 and 432 are not conducting. The upper and lower tuned circuits through the winding 426 are tuned to a frequency above and a frequency below the normal output frequency of the amplifier 32a when the temperature of the combustion gases is correct. The normal current flowing through the two tuned circuits with a normal frequency note of the whistle 24 are arranged to be substantially equal so that the armature 442 of the relay will remain in its center position. As, however, the note of the whistle 24 goes up and the frequency of the output of the amplifier 32a likewise increases, the current through the circuit tuned to the higher frequency will exceed that in the circuit tuned to the lower frequency and the armature 442 will be moved in one direction to energize one field winding 444 of the motor 420. As, however, the note of the whistle decreases, and the output frequency of the amplifier 32 likewise decreases, the circuit tuned to the lower frequency will supply more current through its half winding of the relay 429 and the armature 442 will be pulled in the opposite direction to energize the other field winding 446 of the motor 420. The windings 444 and 446 are arranged so that they will cause rotation of the armature of the motor 420 in opposite directions. It may now, therefore, be seen that as the note of whistle increases above the desired frequency, the motor 420 will be arranged when energized to rotate in one direction and when the note generated by the whistle 24 is below that desired, the motor 420 will be arranged to rotate in the opposite direction.

The outputs of the amplifiers 32a and 46a are fed into a mixing network 448, the output of which is connected to an energizing winding of a relay 450. The mixing network 448 is of any of the usual type in which the output frequency thereof is the beat note frequency of the two input frequencies which, in this case, are supplied by the amplifiers 32a and 46a. Therefore, the relay 450 will be energized once each half cycle of the beat note between the frequencies of the amplifiers 32a and 46a to close its contacts a which complete an energizing circuit to the motor 420. It may thus be seen that the motor 420 will be energized once each half cycle of the beat note between the output of the amplifiers 32a and 46a for energization of the motor 420. If the beat note is of a high frequency, the motor 420 will be energized at frequent intervals and its speed will be substantial. As the frequency of the beat note decreases, the frequency of energization of the motor 420 will also decrease and the speed of rotation will decrease. When the frequencies of the amplifiers 32a and 46a are exactly identical, the relay 429 will not be operated to close circuits through either of the windings 444 or 446 and neither will the relay 450 be energized to complete its portion of the circuit to the motor 420 so the motor 420 will not rotate.

If it is desired to adjust the normal operating temperature of the turbine 1, the capacitors 438 and 440 are of the variable capacity type and arranged to be controlled by means of the knob of the pilot's control 48 in such a manner that the balanced current flow condition in the circuits through the two halves of the winding 426 occurs at the same frequency as the output frequency of the control 48. If desired, the relay 450 may be of the type in which the contacts thereof are closed for a fixed time interval for each energization thereof irrespective of the length of the particular energization. In other respects, the operation of the modified control system as shown in Fig. 9 is substantially that described above and will not again be repeated.

Figure 10:
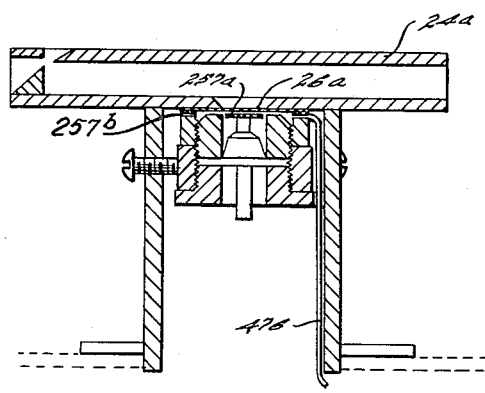
Fig. 10 is a partial sectional view of a modified whistle for use in the invention.

In Fig. 10, there is shown a modified form of whistle 24a which instead of being the closed-end, quarter wave length type is of the open-end, half wave length type and may be used when it is desired to measure the temperatures of a free-flowing gas. In this form, the diaphragm 26a is provided at the half-way point of the resonating tube whereby it is subjected to maximum pressure changes of the vibrating gases in the whistle 24a. Cooling air for the diaphragm 26a is furnished through the conduit 476 from a suitable source of supply and blows across the lower face of the diaphragm 26a and above that of the insulated terminal 257a and then outwardly through opening 257b and exhausts to atmosphere. The insulated terminal 257a may be connected by suitable lead wires, not shown, to the amplifier 32 while the casing of the whistle 24a may preferably be grounded and connected in that manner to the grounded terminal of the amplifier 32.

In Fig. 11, there is shown a similar control system to that described above but, instead of being applied to an airplane, is applied to a motor vehicle. The reference character 500 indicates generally the accelerator pedal of the vehicle which is operatively connected for changing the frequency of the amplifier 46 by its actuation of the control 48b. The whistle 24 is connected to turbine, not shown, for driving of the motor vehicle in the manner similar to its connection to the turbine shown in Fig. 1 and controls the output frequency of the amplifier 32. The two-phase output of the amplifier 32 is fed directly to the stator windings of the motor 40 while the two-phase output of the amplifier 46 is fed to the stator of the synchronous motor 42, whereby the rotation of the flux field of the motor 40 with respect to space is dependent upon the difference in frequencies of the amplifiers 32 and 46, as described above, for driving of the output shaft 41 of the motor 40 whereby the needle 160 is adjusted to control flow of fuel to the turbine, such being fragmentarily shown because it is identical to the showing thereof in previously described figures.

A pair of cooperating contacts 502 and 504 are actuated by the accelerator control 500 and have a fixed position for each adjustment of the control 500. The turbine 1 will also have a normal speed for each of these positions. The contacts 506 and 508 are positioned by a tachometer 510 operated through gearing 512 driven by the turbine shaft 8 and have a position corresponding to the actual turbine speed. The relative positioning of the contacts 502, 504, 506 and 508 will remain constant whenever the normal and actual turbine speeds are equal, irrespective of magnitude. If the speed of the turbine corresponds substantially to that of the positioning of the accelerator 500, neither of the sets of contacts 502 and 506, or 504 and 508 will be closed and the solenoid 140 will be de-energized so that the turbine will be controlled by the motor 40 substantially as described in connection with the airplane control when the contacts 130 and 132 are not closed. When, however, the speed of the turbine does not correspond closely with the positioning of the accelerator 500, one of the sets of contacts 502 and 506 or 504 and 508 will be closed thereby energizing the solenoid 140 so that the turbine will be under control of the whistle 24 substantially as it was controlled in the above description when the contacts 132 and 134 were closed.

In Fig. 12, the tachometer 510 has been replaced with an accelerometer 513 which is driven by the gearing 512 from the turbine shaft 8. The accelerometer comprises a shaft 514 positively driven through the gearing 512 by the turbine shaft 8, an inertia member 515 impositively driven from the shaft 514 through an involute spring 516 shown in section, connecting the member 515 and the shaft 514, a cam 517 formed as part of the member 515, a roller follower 518, a cage 519 mounting the roller follower, and a non-circular end 520 on the shaft 514 engaged by portions 521 of the cage 519 to prevent relative rotation of the shaft and the cage. The cage 519 may shift axially but not rotatively with respect to the shaft 514. The member 515 may shift rotatively but not axially with respect to the shaft 514. The base of the cage 519 engages a projection 522 on a lever 523 pivoted at one end as indicated at 524 and carrying a ring-like insulated contact 525 at the other end. A spring 525a maintains the projection 522 on the lever in engagement with the base of the cage 519. Depending on the position of the lever 523, the contact 525 is engageable with either of contacts 526 or, as shown in Fig. 12, is out of engagement with both of them. The contacts 526 are insulatedly mounted on flexible arms 527. The ring contact 525 is connected to one side of a source 528 of electrical power, which is connected at the other side to ground. The contacts 526 are connected to the solenoid 140, which is grounded. Normally, the ring contact 525 will, as shown, be out of engagement with both contacts 526 upon constant speed of, or gradual acceleration of, the turbine 1, since the inertia member 515 will follow the speed of the turbine. Upon a rapid acceleration or deceleration of the turbine 1, the inertia member 515 will angularly or rotationally lag behind or lead the positively driven shaft 514, because of the action of the spring 516, and the roller 518 rides up or down the inclined cam 517, causing the cage 519 to be shifted axially along the shaft 514 in one direction or the other. When such shifting of the cage 519 occurs, the lever 523 moves from the middle position shown in Fig. 12 to bring the ring contact 525 into contact with one contact 526 or the other. When this takes place, the circuit of which the contacts 525 and 526 are part is closed, and the solenoid 140 is energized for rapid change in fuel flow.

The specific operation of the form of the invention, as shown in Figs. 11 and 12, is believed to be apparent from the foregoing description in connection with the driving of the airplane propeller 12 by the turbine 1.

In Fig. 13, there is shown a modification of the invention in which the pitch of the propeller blades 50 are adjusted in accordance with temperature errors of the combustion gases being supplied to the turbine 1 and the fuel flow supplied to the turbine 1 is changed in accordance with speed errors of the propeller 12. With this arrangement of the apparatus, changing propeller pitch will vary the torque required to rotate the propeller in accordance with the temperature of the combustion gases being supplied to the turbine 1 in an endeavor to maintain constant temperature of these supplied combustion gases; it being remembered that the air compressor 10 will deliver air to the turbine 1 as a function of turbine or propeller speed. The speed of the propeller operates through the governor 56 to adjust the fuel flow to the turbine 1 so that the fuel delivered to the turbine 1 will be just sufficient to drive the turbine-propeller assembly at the desired speed. The whistle 24 acting through the motor 40 and a gear pump 620 will act to adjust the pitch of the propeller blade 50 to maintain the turbine temperature on the line $d$ (Fig. 7), it being obvious that variations in torque may cause the turbine 1 to operate at any given temperature irrespective of whether the turbine fuel flow remains constant or is varied.

Speed errors of the propeller 12, as determined by the governor 56, act to position the lever 102 whereby the fuel being supplied to the turbine 1 through the valve 150a will be controlled by the speed of the propeller 12 and will be increased or decreased, as the occasion demands, to maintain the desired operating speed of the turbine 1 and propeller 12. The valve needle 160a of the valve 150a is carried by a piston 610 within a cylinder member 612 and divides the interior of the member 612 into two chambers 614 and 616. The chamber 616 is connected to the conduit 116, and the chamber 614 is connected to the conduit 118 whereby the piston 610 is positioned within the member 612 and the valve needle 160a is positioned relative to the port 158 in accordance with the operating speed of the governor 56 in the same manner as the vane 126 of the propeller 12 in the form shown in Fig. 4.

The shaft 41 of the motor 40 is arranged to drive the gear pump 620 arranged in series with conduits 622 and 624 which communicate respectively with chambers 122 and 124. When the shaft 41 is rotated by motor 40 in response to an over-temperature signal of the whistle 24, the pump 620 will withdraw fluid from the chamber 122 through the conduit 622 and deliver fluid through the conduit 624 to the chamber 124 thereby causing the vane 126 to move clockwise and reduce the pitch of the blades 50. With a low temperature signal, the shaft 41 will drive the pump 620 in the other direction thereby increasing the pitch. Make-up fluid is supplied from a reservoir in which the fluid is maintained under a pressure greater than the normal minimum operating suction pressure of the pump 620, through check valves to the conduits 622 and 624.

As in the preceding case in which the whistle directly controls the fuel flow and the governor directly controls the pitch of the propeller blades and therethrough the speed of the turbine 1, the whistle acts to maintain the turbine operation in accordance with the conditions represented by the line $d$ and the governor 56 acts to determine the specific point on the line $d$ at which the turbine operates. As described above, where there are sufficient differences between the curve $d$ and the curve $a$, the turbine and propeller assembly would operate as desired. Since, however, the slope of the two lines in the operating range are so nearly identical, it becomes necessary to provide greater stability which is done as in the preceding case by varying the rate of fuel flow in accordance with temperature errors of the supplied combustion gases.

The shaft 41 is therefore provided with an eddy current motor 630 for operating a switch 132 similar to the switch shown in Fig. 4 and having a ring-like contact member 130a cooperable with either of two contact members 132a, insulatedly mounted on flexible arms 132b, which contact members control the energization of a solenoid 634 in accordance with the magnitude of the temperature error whereby with large temperature errors the control is approximately according to the constant temperature characteristic d, and with small errors is approximately according to the constant fuel flow characteristic as described above. The armature 636 of the solenoid 634 controls the positioning of the fulcrum point 638 of the lever 102. With small temperature errors, the solenoid 634 will not be energized and the fulcrum point 638 will be in its shown position near the left-hand end of the lever 102, providing a lesser amount of movement of the valve member 112 with respect to movement of the piston 96 relative to that which occurs when the solenoid 634 is energized and the fulcrum point 638 is moved to its right-hand position closer to the pivotal connection between the piston stem 110. The movable fulcrum provides means for changing the sensitivity of the fuel governor means in accordance with the magnitude of temperature error, whereby stable operation is obtained in the manner described above. This sensitivity is the ratio of the rate of change of fuel flow to the error in propeller or turbine speed.

What is claimed and is desired to be secured by United States Letters Patent is as follows:

1. In a combustion turbine controlling apparatus, fuel flow controlling mechanism, turbine speed sensitive means having a member the position of which is a function of the operating speed of the turbine and having a satisfied position, means for adjusting said mechanism in response to variations in the operating temperature of said turbine, a two-speed gear drive interconnecting said mechanism adjusting means and said fuel mechanism whereby the operation of said mechanism by said adjusting means in response to given errors in said operating temperature may be controlled, said gear drive including a controlling member for alternately providing either of two speeds for said gear drive, and means controlled by said speed sensitive means in response to the magnitude of variations in the turbine speed from a desired value to actuate said drive controlling member of said gear drive.

2. In a controlling apparatus for a combustion turbine having an output shaft and means for supplying a combustive fluid thereto, a speed responsive mechanism driven by said shaft and having a satisfied speed condition, means for controlling the temperature of the combustive fluid, a whistle having a resonating chamber, conduit means communicatively connected to transmit a sample of said fluid to said chamber and operative to supply a sufficient quantity to maintain the temperature of the fluid in said chamber proportional to that of the main body of said fluid whereby the resonating frequency of said chamber is proportional to the temperature of the main body of said fluid, a first source of pulsating electrical potential having a variable frequency output, means controlling said output frequency in response to the resonating frequency of said chamber, a second source of pulsating potential, means for adjusting the frequency of said second source to a value which is a function of the value of said resonating frequency when the temperature of said fluid is at the desired value, a first electric motor having a wound stator and a rotor, means arranged to support said stator and said rotor for bodily rotation, means connecting said stator for energization from said first source, a second electric motor connected for energization from said second source and havng an output shaft connected to and for rotating said stator, said shaft being rotated at a speed proportional to the frequency output of said second source, a variable speed ratio transmission interconnecting said rotor with said combustive fluid temperature controlling means for controlling the temperature of the combustive fluid by said whistle, and means controlled by said speed responsive mechanism in response to speed errors from said satisfied speed condition for controlling the speed ratio of said transmission.

3. In a controlling apparatus for a combustion turbine having an output shaft and means for supplying a combustive fluid thereto, a speed responsive mechanism driven by said shaft and having a satisfied speed condition, means for controlling the temperature of the combustive fluid, a whistle having a resonating chamber, conduit means communicatively connected to transmit a sample of said fluid to said chamber and operative to supply a sufficient quantity to maintain the temperature of the fluid in said chamber proportional to that of the main body of said fluid whereby the resonating frequency of said chamber is proportional to the temperature of the main body of said fluid, a first source of pulsating electrical potential having a variable frequency output, means controlling said output frequency in response to the resonating frequency of said chamber, a second source of pulsating potential, the frequency of said second source being the frequency difference of a pair of frequency controlling apparatus, means for adjusting the frequency of one of said apparatus whereby the frequency of said second source may be determined, a first electric motor having a wound stator and a rotor, means arranged to support said stator and said rotor for bodily rotation, means connecting said stator for energization from said first source, a second electric motor connected for energization from said second source and having an output shaft connected to and for rotating said stator, said shaft being rotated at a speed proportional to the frequency output of said second source, a variable speed ratio transmission interconnecting said rotor with said combustive fluid temperature controlling means for controlling the temperature of the combustive fluid by said whistle, and means controlled by said speed responsive mechanism in response to speed errors from said satisfied speed condition for controlling the speed ratio of said transmission.

4. In a controlling apparatus for a combustion turbine having an output shaft and means for supplying a combustive fluid thereto, a speed responsive mechanism driven by said shaft and having a satisfied speed condition, means for controlling the temperature of the combustive fluid, a whistle having a resonating chamber, conduit means communicatively connected to transmit a sample of said fluid to said chamber and operative to supply a sufficient quantity to maintain the temperature of the fluid in said chamber proportional to that of the main body of said fluid whereby the resonating frequency of said chamber is proportional to the temperature of the main body of said fluid, a first source of alternating electrical potential having a variable frequency polyphase output, means controlling said output frequency in response to the resonating frequency of said chamber, a second source of polyphase alternating potential, means for adjusting the frequency of said second source to determine the normal value of said resonating frequency, a first electric motor having a wound multiphase stator and a rotor, means arranged to support said stator and said rotor for bodily rotation, means connecting said stator for energization from said first source to provide a rotating flux field, a second polyphase synchronous electric motor connected for energization from said second source and having an output shaft connected to and for rotating said stator, a variable speed ratio transmission interconnecting said rotor with said combustive fluid controlling means for controlling the temperature of the combustive fluid by said whistle, and means controlled by said speed responsive mechanism in respone to speed errors from said satisfied speed condition for controlling the speed ratio of said transmission.

5. In a controlling apparatus for a combustion turbine having an output shaft and means for supplying a combustive fluid thereto, a speed responsive mechanism driven by said shaft and having a satisfied speed condition, means for controlling the temperature of the combustive fluid, a whistle having a resonating chamber, conduit means communicatively connected to transmit a sample of said fluid to said chamber and operative to supply a sufficient quantity to maintain the temperature of the fluid in said chamber proportional to that of the main body of said fluid whereby the resonating frequency of said chamber is proportional to the temperature of the main body of said fluid, a first source of pulsating electrical potential having a variable frequency output, means controlling said output frequency in response to the resonating frequency of said chamber, an electric motor having a wound stator and a rotor, means arranged to support said stator and said rotor for bodily rotation, means connecting said stator for energization from said first source, an output shaft connected to and for rotating said stator, means operable to rotate said shaft at a speed proportional to the frequency output of said source when the temperature of the combustive fluid is at the desired value, a variable speed ratio transmission interconnecting said rotor with said combustive fluid controlling means, and means controlled by said speed responsive mechanism in response to speed errors from a desired speed for controlling the speed ratio of said transmission.

6. In a combustion turbine assembly, a power output absorbing driven member having a predetermined range of operating speed-torque characteritics, a fuel supply means for furnishing said turbine assembly with a controlled quantity of fuel for producing combustion gases, a first control means for varying the speed-torque characteristics of said driven member, said first control means being adapted to function within predetermined operating limits, a second control means for regulating the rate of flow of the fuel furnished by said fuel supply means, one of said control means including portions operatively connected to said driven member and the other control means having portions exposed to said gases, said one control means being responsive to the output speed of said driven member and the other control means being responsive to the operating temperatures of said gases, the magnitude of said temperature and said output speed being related and proportional to the rate at which fuel is supplied to said turbine assembly, said temperature and said speed comprising variable operating characteristics of said turbine assembly, and means interconnecting said first and said second control means for varying the rate of response of said second control means to variations in the operating characteristic associated with the latter, said first control means being operative upon a predetermined variation in the magnitude of the other of said operating characteristics to initiate the operation of said rate controlling means.

7. The combination as set forth in claim 6 wherein said one control means is said first control means and said other control means is said second control means.

8. In a combustion turbine assembly including a power absorbing turbine driven member having speed-torque characteristics substantially similar to that of the turbine, a burner, air intake means including a compressor for supplying said burner with air, a fuel supply system connected to said burner for providing the same with a regulated flow of fuel to produce combustion products for driving the turbine, and a regulator for the burner means having portions connected to said fuel supply system for providing a regulated fuel flow rate and burner temperature; the combination including a first control mechanism responsive to variations in the temperature of the combustion products for adjusting said fuel flow rate, and another control mechanism operatively connected to said first control mechanism and responsive to variations in the speed-torque characteristics of said driven member for altering the rate of adjustment of said first control mechainsm thereby providing for stable operation of the assembly.

References Cited in the file of this patent

UNITED STATES PATENTS

| 775,535 | Meissner | Nov. 22, 1904 |
| 912,144 | Mavor | Feb. 9, 1909 |
| 2,065,703 | Hubbard | Dec. 29, 1936 |
| 2,245,562 | Becker | June 17, 1941 |
| 2,259,437 | Dean | Oct. 21, 1941 |
| 2,283,750 | Mikelson | May 19, 1942 |
| 2,306,953 | Jung | Dec. 29, 1942 |
| 2,320,311 | Myers | May 25, 1943 |
| 2,336,052 | Anderson | Dec. 7, 1943 |
| 2,350,781 | Lichte | June 6, 1944 |
| 2,382,847 | Baumann | Aug. 14, 1945 |
| 2,404,428 | Bradbury | July 23, 1946 |
| 2,405,888 | Holley | Aug. 13, 1946 |
| 2,410,774 | Chandler | Nov. 5, 1946 |
| 2,432,177 | Sedille | Dec. 9, 1947 |
| 2,457,595 | Orr | Dec. 28, 1948 |
| 2,472,396 | Shoenbaum | June 7, 1949 |
| 2,474,033 | Chamberlin et al. | June 21, 1949 |
| 2,606,420 | Moore | Aug. 12, 1952 |